(12) United States Patent
Tsai et al.

(10) Patent No.: US 11,136,125 B2
(45) Date of Patent: Oct. 5, 2021

(54) LIQUID CHILLED GALLEY BAR UNIT

(71) Applicant: Rockwell Collins, Inc., Cedar Rapids, IA (US)

(72) Inventors: Hsin-I Tsai, Newport Pagnell (GB); Peter John Leslie Burd, Burry Port (GB); Richard Henry Jolley, Addington (GB)

(73) Assignee: Rockwell Collins, Inc., Cedar Rapids, IA (US)

( * ) Notice: Subject to any disclaimer, the term of this patent is extended or adjusted under 35 U.S.C. 154(b) by 123 days.

(21) Appl. No.: 15/940,270

(22) Filed: Mar. 29, 2018

(65) Prior Publication Data

US 2018/0281957 A1 Oct. 4, 2018

Related U.S. Application Data

(60) Provisional application No. 62/478,202, filed on Mar. 29, 2017.

(51) Int. Cl.
| | | |
|---|---|---|
| *B64D 11/04* | (2006.01) | |
| *F25D 15/00* | (2006.01) | |
| *F28D 9/00* | (2006.01) | |
| *F28F 3/02* | (2006.01) | |
| *F25D 23/12* | (2006.01) | |
| *F25B 21/02* | (2006.01) | |
| *F25D 25/02* | (2006.01) | |

(52) U.S. Cl.
CPC .............. *B64D 11/04* (2013.01); *F25D 15/00* (2013.01); *F25D 23/12* (2013.01); *F28D 9/0062* (2013.01);

(Continued)

(58) Field of Classification Search
CPC .... F25B 21/02; F25B 21/00; F25B 2321/002; F25B 2321/02; F25B 2321/021;
(Continued)

(56) References Cited

U.S. PATENT DOCUMENTS

| 2,973,627 A | * | 3/1961 | Lackey | ................... H01L 35/00 |
| | | | | 62/3.61 |
| 3,733,836 A | * | 5/1973 | Corini | ..................... F25B 21/02 |
| | | | | 62/3.61 |

(Continued)

FOREIGN PATENT DOCUMENTS

| DE | 10261366 A1 | * | 7/2004 | ........... F25D 31/007 |
| WO | WO-9519255 A1 | * | 7/1995 | ........... F25D 23/087 |

(Continued)

OTHER PUBLICATIONS

Refrigerator Storage Drawer Removal and Reinstallation—Subzero-Wolf (Oct. 2013) (Year: 2013).*

(Continued)

*Primary Examiner* — Len Tran
*Assistant Examiner* — Jenna M Hopkins
(74) *Attorney, Agent, or Firm* — Suiter Swantz pc llo

(57) ABSTRACT

A solid state liquid-chilled bar unit for an aircraft galley includes a multilevel frame dimensioned to fit the galley and including stacked slots, each slot configured to fit a compartment. Warmer compartments include a liquid thermoelectric device (LTD) with "cold" and "hot" sides and a liquid heat exchanger (LHE) connected to the cold side. Scroll fans circulate air over a finned heat exchanger (on the LTD's hot side) to heat the compartment. Chiller compartments include LTDs with an LHE connected to the "hot" side, and may be bottle coolers or chiller drawers. Bottle coolers chill bottles or other containers via conductive contact with the LTD "cold" side, while chiller drawers chill air by circulating it over a finned heat exchanger on the "cold" side. Unchilled drawers store food, drink, or supplies at or near the ambient cabin temperature.

15 Claims, 5 Drawing Sheets

(52) U.S. Cl.
CPC .............. *F28F 3/025* (2013.01); *F25B 21/02* (2013.01); *F25B 2321/0252* (2013.01); *F25B 2700/21* (2013.01); *F25D 25/025* (2013.01); *Y02T 50/40* (2013.01)

(58) Field of Classification Search
CPC ............ F25B 2321/023; F25B 21/0251; F25B 21/025; F25B 21/0252; F25B 21/0212; F25B 21/0211; B64D 11/04; B64D 2013/0629; F25D 11/00; F25D 11/02; F25D 23/12
USPC .......................................................... 62/3.4
See application file for complete search history.

(56) References Cited

U.S. PATENT DOCUMENTS

| | | | |
|---|---|---|---|
| 5,069,273 A | 12/1991 | O'Hearne | |
| 5,269,146 A * | 12/1993 | Kerner | F25B 21/02 165/104.33 |
| 5,396,046 A | 3/1995 | Oelfke | |
| 5,590,532 A * | 1/1997 | Bachman | B67D 1/0869 62/3.3 |
| 6,003,319 A * | 12/1999 | Gilley | F28F 1/128 62/3.7 |
| 6,272,867 B1 * | 8/2001 | Barrash | F25B 9/14 62/6 |
| 6,344,630 B1 * | 2/2002 | Jarvis | A47J 39/006 219/386 |
| 6,532,749 B2 * | 3/2003 | Rudick | F25B 9/14 62/239 |
| 6,637,320 B2 * | 10/2003 | Grandi | A47J 39/006 165/48.1 |
| 6,761,332 B1 * | 7/2004 | Bengtsson | B64D 11/04 244/117 R |
| 6,845,627 B1 * | 1/2005 | Buck | B64D 11/04 165/919 |
| 7,007,501 B2 | 3/2006 | Hu | |
| 7,231,778 B2 | 6/2007 | Rigney et al. | |
| 7,836,876 B2 * | 11/2010 | Schellenberg | A47J 39/006 126/268 |
| 7,937,954 B2 * | 5/2011 | Kang | B60N 2/793 62/3.3 |
| 8,516,832 B2 * | 8/2013 | Bhavsar | F25D 11/00 62/3.6 |
| 8,667,807 B2 * | 3/2014 | Veltrop | A47F 3/06 62/252 |
| 8,936,260 B2 * | 1/2015 | Burd | B64D 11/0007 280/47.35 |
| 8,978,392 B2 * | 3/2015 | Blackway | F25B 21/02 62/3.62 |
| 9,399,516 B2 | 7/2016 | Hawkins et al. | |
| 9,416,995 B2 * | 8/2016 | Brija | F25B 21/04 |
| 9,587,872 B2 * | 3/2017 | Boarman | F25B 21/02 |
| 9,664,422 B2 * | 5/2017 | Godecker | A47J 39/02 |
| 9,766,005 B2 * | 9/2017 | Boarman | F25B 21/02 |
| 9,909,789 B2 * | 3/2018 | Brija | F21V 33/0036 |
| 10,137,987 B2 * | 11/2018 | Burd | B62B 5/0447 |
| 10,207,804 B1 * | 2/2019 | Gentry | B64D 13/06 |
| 10,295,229 B2 * | 5/2019 | Pal | F25B 21/02 |
| 10,405,650 B2 * | 9/2019 | Turner | A47J 36/2483 |
| 2004/0025516 A1 * | 2/2004 | Van Winkle | B60H 1/00478 62/3.3 |
| 2004/0074399 A1 * | 4/2004 | Zhou | A47J 39/006 99/448 |
| 2005/0034477 A1 * | 2/2005 | Hu | B64D 13/00 62/435 |
| 2005/0040231 A1 * | 2/2005 | Allison | G06K 7/10 235/385 |
| 2005/0210910 A1 * | 9/2005 | Rigney | B60H 1/00014 62/407 |
| 2006/0162341 A1 * | 7/2006 | Milazzo | A47J 36/2433 62/3.3 |
| 2006/0237182 A1 | 10/2006 | Godecker et al. | |
| 2006/0288709 A1 * | 12/2006 | Reidy | B01D 5/0042 62/3.4 |
| 2008/0075821 A1 | 3/2008 | Lagares Corominas et al. | |
| 2010/0071384 A1 * | 3/2010 | Lu | B60H 1/00592 62/3.2 |
| 2010/0101236 A1 * | 4/2010 | Shah | F25B 21/02 62/3.2 |
| 2010/0224726 A1 * | 9/2010 | Lu | F25D 17/06 244/118.5 |
| 2011/0252813 A1 * | 10/2011 | Veltrop | A47J 36/2483 62/3.3 |
| 2011/0289939 A1 * | 12/2011 | Lu | F25B 21/04 62/3.3 |
| 2012/0047911 A1 | 3/2012 | Bhavsar et al. | |
| 2012/0055170 A1 * | 3/2012 | Lilke | F24F 5/0042 62/3.3 |
| 2012/0186273 A1 * | 7/2012 | Arrigo | B01D 53/72 62/3.6 |
| 2012/0312030 A1 | 12/2012 | Lu | |
| 2013/0047657 A1 * | 2/2013 | Oswald | B64D 11/04 62/407 |
| 2013/0048264 A1 * | 2/2013 | Lu | F25D 17/02 165/287 |
| 2013/0061605 A1 | 3/2013 | de Rochemont | |
| 2013/0247590 A1 * | 9/2013 | Lu | F25B 21/02 62/3.6 |
| 2013/0247600 A1 * | 9/2013 | Lu | F25B 41/00 62/89 |
| 2013/0269384 A1 * | 10/2013 | Burd | B64D 11/04 62/285 |
| 2013/0291852 A1 | 11/2013 | Boubeddi | |
| 2014/0123683 A1 * | 5/2014 | Hou | F25B 21/02 62/3.6 |
| 2014/0150461 A1 * | 6/2014 | Veltrop | F25D 25/028 62/3.6 |
| 2015/0007600 A1 | 1/2015 | Godecker et al. | |
| 2016/0018139 A1 * | 1/2016 | Olsson | F25B 21/02 62/3.3 |
| 2016/0114880 A1 * | 4/2016 | Reiss | B64D 11/04 307/10.1 |
| 2016/0366919 A1 * | 12/2016 | van Someren Greve | A23L 3/363 |
| 2017/0038122 A1 * | 2/2017 | Lu | F25D 19/003 |
| 2017/0215620 A1 * | 8/2017 | Dade | A47B 88/90 |
| 2017/0259956 A1 * | 9/2017 | Hori | A45C 7/0045 |
| 2017/0273325 A1 * | 9/2017 | Arrigo | F25B 21/02 |
| 2017/0282679 A1 * | 10/2017 | Tsai | B60H 1/00478 |
| 2017/0292737 A1 * | 10/2017 | Moon | F25B 21/02 |
| 2017/0328610 A1 * | 11/2017 | Tao | F25D 11/00 |
| 2017/0328611 A1 * | 11/2017 | Tao | F25D 19/00 |
| 2017/0350636 A1 * | 12/2017 | Tao | F25D 11/00 |
| 2018/0016018 A1 * | 1/2018 | Burd | B64F 5/00 |
| 2018/0031285 A1 * | 2/2018 | Thomas | F25D 17/06 |
| 2018/0252446 A1 * | 9/2018 | Place | F25D 31/002 |
| 2018/0283765 A1 * | 10/2018 | Yl | F25D 11/02 |
| 2018/0347871 A1 * | 12/2018 | Park | F25B 21/04 |
| 2019/0203983 A1 * | 7/2019 | Jeon | H05K 7/20309 |
| 2019/0218029 A1 * | 7/2019 | Petz | B65F 1/14 |
| 2019/0271489 A1 * | 9/2019 | Hojer | F25B 1/04 |

FOREIGN PATENT DOCUMENTS

| | | | | |
|---|---|---|---|---|
| WO | WO-9519533 A1 * | 7/1995 | .............. | F25B 21/02 |
| WO | WO-2012019353 A1 * | 2/2012 | .............. | F25B 21/02 |
| WO | WO-2014067492 A1 * | 5/2014 | .............. | B23P 15/26 |
| WO | WO-2016159649 A1 * | 10/2016 | .............. | F24F 3/153 |

OTHER PUBLICATIONS

International Search Report and Written Opinion dated Jun. 22, 2018 for PCT/US18/25228.

* cited by examiner

LIQUID CHILLED GALLEY BAR UNIT

CROSS-REFERENCE TO RELATED APPLICATIONS

The instant application claims priority under 35 U.S.C. § 119(e) to provisional U.S. Patent Application Ser. No. 62/478,202, filed Mar. 29, 2017. Said provisional U.S. Patent Application 62/478,202 is herein incorporated by reference in its entirety.

BACKGROUND

Currently, devices for cooling or chilling food or drink in aircraft galleys include either line replaceable units (LRU) or galley inserts (GAIN) utilizing vapor-cycle or chilled-liquid technology. Such units may depend on environmentally unfriendly gases or liquids as coolant media, and their size and complexity may make them difficult to maintain or replace. Furthermore, upgrading or evolving the underlying technology may be hampered by the stringent airworthiness certification requirements associated with GAINs.

SUMMARY

In one aspect, embodiments of the inventive concepts disclosed herein are directed to a solid-state liquid-chilled bar unit for an aircraft galley. The bar unit has a multilevel frame dimensioned to fit an aircraft galley and including vertically stacked compartments, each compartment capable of housing a line replaceable unit (LRU; e.g., two, three, five, or more depending on the galley dimensions). For example, the bar unit includes one or more warming drawers having a semi-enclosed liquid thermoelectric device (LTD) having a "hot" side and a "cold" side separated by a thermoelectric module. A liquid heat exchanger (LHE) is connected to the "cold" side and a finned liquid/air heat exchanger to the "hot" side. The LHE may draw heat from returning liquid coolant to heat the "cold" side of the LTD, which also heats the "hot" side. The warming drawer includes a scroll fan for heating the interior of the warming drawer (and any food, liquids, or supplies placed therein) by circulating air over the finned heat exchanger (which draws heat from the "hot" side of the LTD). The bar unit may include one or more chiller compartments (e.g., bottle coolers for conductively chilling bottles or other similar containers or chilled drawers incorporating a scroll fan to circulate air over a chilled finned liquid/air heat exchanger) incorporating an LTD and an LHE connected to the "hot" side of the LTD. The LHE is supplied with freshly chilled liquid coolant to chill the "hot" side, further chilling the "cold" side of the LTD and the finned liquid/air heat exchanger.

In a further aspect, embodiments of the inventive concepts disclosed herein are directed to a liquid-chilled bar unit for an aircraft galley. The bar unit includes a multilevel frame dimensioned to fit an aircraft galley, each level of the frame corresponding to a stacked slot within which a compartment may be installed, the compartment including an LRU. For example, a compartment may be installed in a first stacked slot, removed from the stacked slot, and reinstalled into a second stacked slot (e.g., above or below its previous location) if the second stacked slot is of similar size. The compartments may include warmer compartments, chiller compartments, and unchilled/ambient compartments. The warmer compartments include a liquid thermoelectric device (LTD) having hot and cold sides. A liquid heat exchanger (LHE) is connected to the cold side for heating the LTD with returning (and warmed) liquid coolant. A finned heat exchanger is connected to the hot side for internally heating the warmer compartment via a scroll fan circulating air over the fins of the heat exchanger. The chiller compartments also have an LTD with an LHE connected to its hot side, supplied with freshly chilled liquid coolant. The chiller compartment may be a chiller drawer, with a finned heat exchanger (connected to the LTD's cold side) and scroll fan for chilling the drawer by circulating chilled air over the fins, or a bottle cooler, including one or more conductive coolers capable of accepting a bottle or other similarly sized container and chilling the bottle/s via contact with the LTD's cold side. The unchilled compartments may be capable of storing food, drink, or supplies at or near ambient cabin temperature. The LTDs are supplied with positive-voltage and negative-voltage power (the direction of heat transfer depending on the voltage polarity) by power supplies connected to the aircraft power supply.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
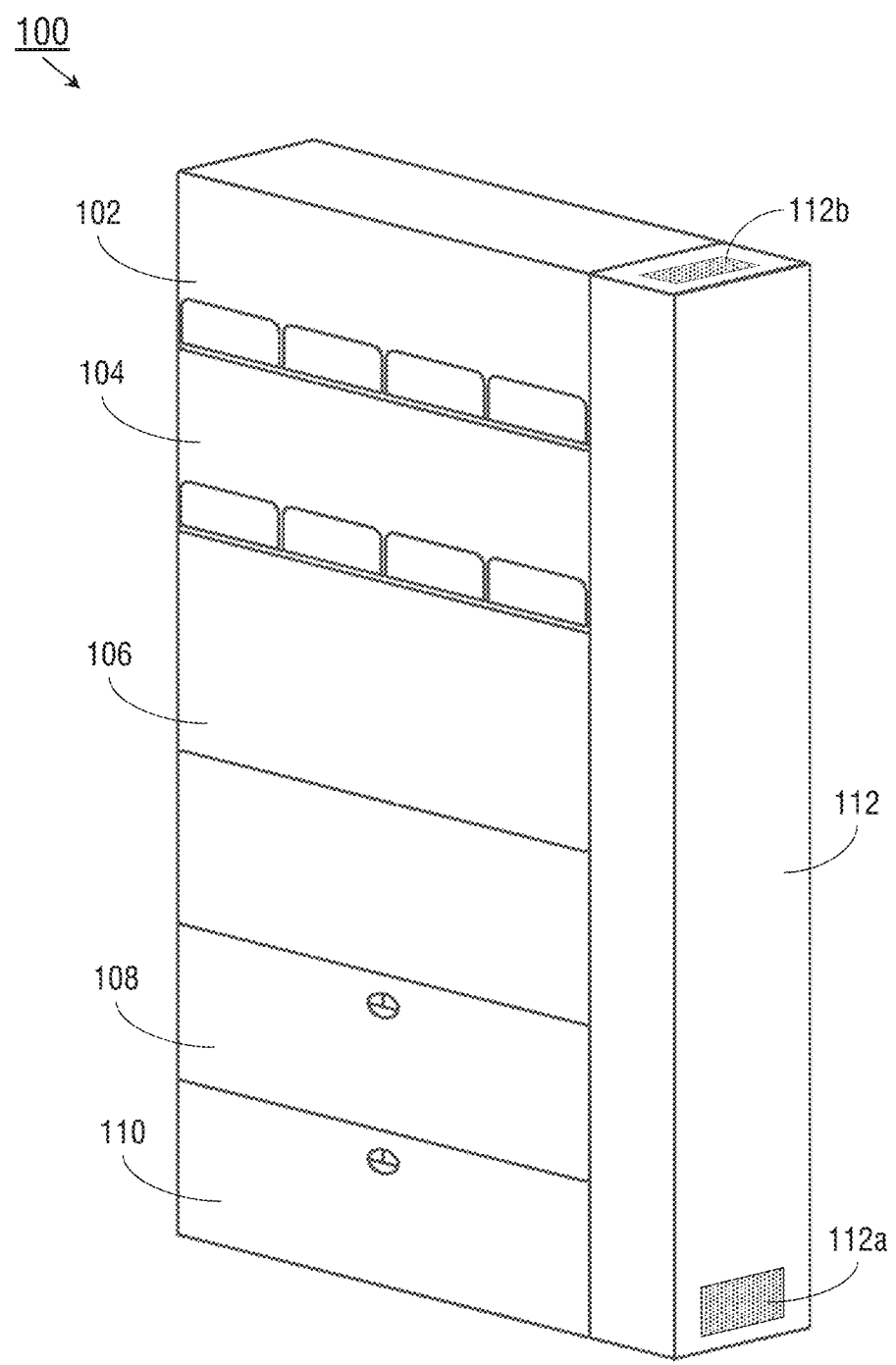
FIG. 1 illustrates an exterior perspective view of an exemplary embodiment of a line replaceable unit (LRU) according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a self-contained liquid-chilled galley bar unit for an aircraft galley, the bar unit including multiple levels defined by a frame, each level capable of housing an individual line replaceable unit (LRU). LRUs may be ambient/unchilled compartments or warmers and chillers incorporating liquid thermoelectric devices (LTD), which may significantly reduce the size, cost, weight, and complexity of the bar unit as a whole. Furthermore, the maintenance costs and mean time between failures (MTBF) of the bar unit may be significantly improved and its eventual replacement far quicker and easier. The bar unit may scale up or down in size or complexity depending on the dimensions of the aircraft galley, and individual LRUs may be removed from their slots and quickly reinstalled to other similarly sized slots. In addition, the use of LTDs may eliminate the need for environmentally unfriendly fluids or gases in the manufacture and operation of galley chillers.

Referring to FIG. 1, an exemplary embodiment of a liquid-chilled galley bar unit 100 according to the inventive concepts disclosed herein may include a series of compartments vertically stacked in a multilevel frame, each individual compartment including a line replaceable unit (LRU; e.g., a warmer, chiller, or ambient compartment) installed therein. For example, the galley bar unit 100 may include in descending order (but is not limited to) an unchilled drawer 102, an enclosed warming drawer 104, a bottle cooling compartment 106, a pullout chiller drawer 108, and a pullout unchilled drawer 110. The unchilled drawer 102 and pullout unchilled drawer 110 may be used for storage of food, beverages or other fluids, and supplies storable at or near the ambient cabin temperature. The enclosed warming drawer 104 may be used for heating or reheating cookies or other small food products to an appropriate temperature, or for maintaining said food products at a desired temperature for short periods of time. The galley bar unit 100 may be a standalone unit (e.g., as opposed to a galley insert (GAIN)) sized to fit the galley of a variety of aircraft, and may vary in size and configuration depending on the particular embodying aircraft. For example, the galley bar unit 100 may vary in height, or comprise more or less than the five vertically stacked compartments shown by FIG. 1. The galley bar unit 100 may include any appropriate arrangement or configuration of two or more ambient compartments (e.g., the unchilled drawer 102 or pullout unchilled drawer 110), warmer compartments (e.g., the enclosed warming drawer 104), and chiller compartments (e.g., the bottle cooling compartment 106 or pullout chiller drawer 108). It may be noted that the airworthiness certification requirements with respect to LRU are less stringent than those associated with GAIN.

The galley bar unit 100 may further include a chimney 112 or air shaft extending vertically along a side of the galley bar unit. The chimney may include one or more air intakes (112a) for drawing in ambient air from the base of the galley bar unit 100 (e.g., proximate to the pullout unchilled drawer 110 corresponding to its bottom-most level). The ambient air may be passed upward through the chimney 112 for output through an upwardly oriented air exhaust vent (112b) or for use in conjunction with a liquid coolant recirculation system (as will be shown below by FIG. 4).

Figure 2:
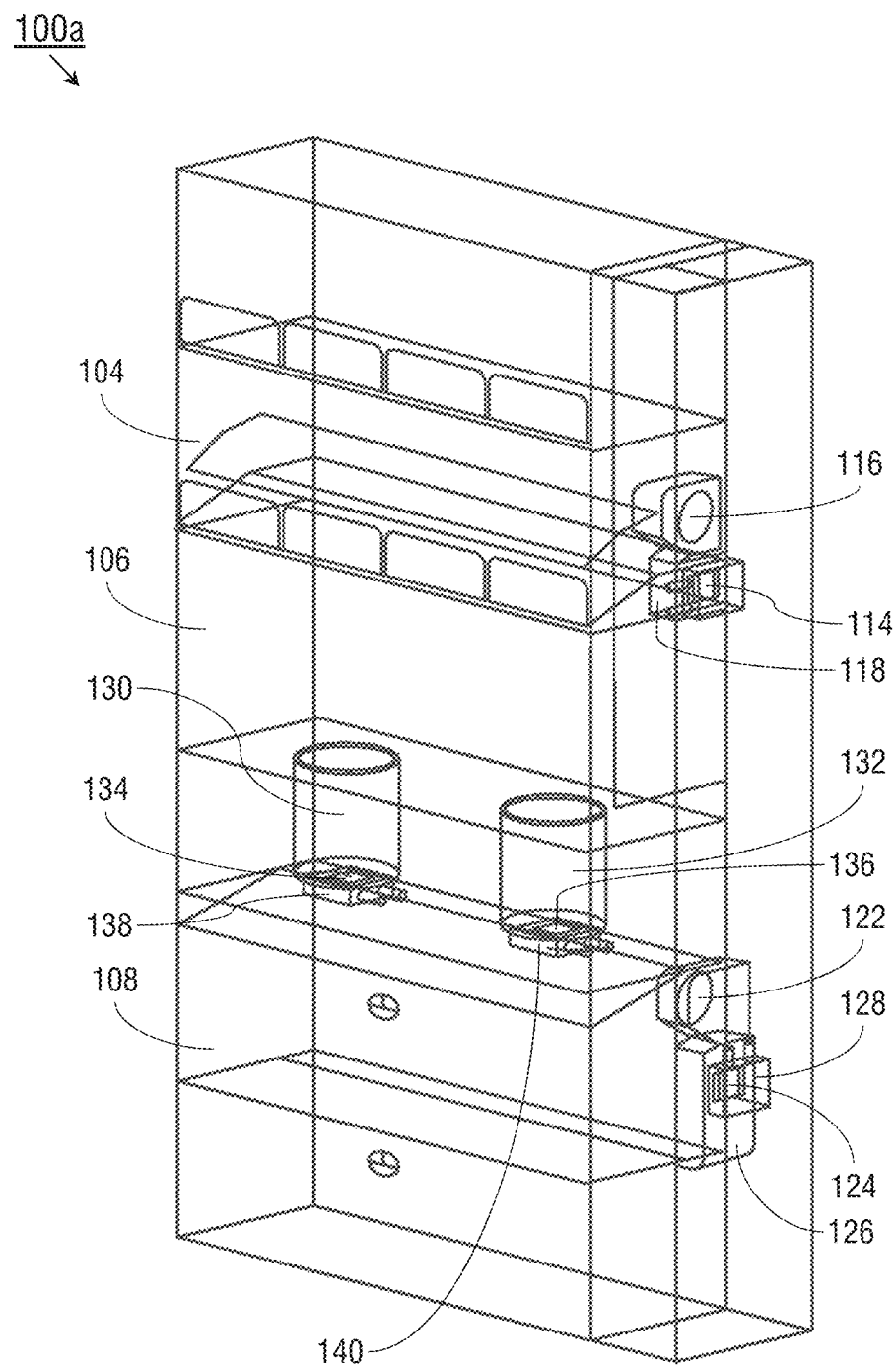
FIG. 2 illustrates components of the LRU of FIG. 1.

Referring to FIG. 2, the galley bar unit 100a may be implemented and may function similarly to the galley bar unit 100 of FIG. 1, except that the galley bar unit 100a may incorporate liquid-cooled thermoelectric devices (LTD) to provide specific and unique methods of cooling and heating food and beverages via the compartments of the galley bar unit 100a.

For example, the enclosed warming drawer 104 may circulate warm air into and throughout the warming drawer via an LTD 114 and a scroll fan 116. The LTD 114 may have a "hot side" and a "cold side" (as will be shown in greater detail below by FIGS. 3A-B) with a thermoelectric module sandwiched between the two sides, such that a current applied to the thermoelectric module may create or alter a temperature differential between the hot and cold sides of the LTD (or, conversely, a temperature differential may generate a current within the thermoelectric module). The enclosed warming drawer 104 may incorporate a finned aluminum liquid/air heat exchanger (118) connected to the hot side of the LTD 114 and a liquid heat exchanger 120 (LHE) connected to the cold side of the LTD. For example, the LHE 120 may draw heat (e.g., from warmed liquid coolant recirculating through the galley bar unit 114) for transfer to the cold side of the LTD 114; when the cold side is heated, the hot side of the LTD is similarly heated (e.g., a temperature shift from 0° C. to 10° C. on the cold side may result in an equivalent shift from 25° C. to 35° C. on the hot side) and the heat transferred to the finned aluminum liquid/air heat exchanger 118. Air may then be drawn into and circulated throughout the enclosed warming drawer 104 by the scroll fan 116, the ambient air passed over the fins of the liquid/air heat exchanger 118 to warm it further (and thus the interior, and contents, of the enclosed warming drawer 104).

Similarly, the pullout chiller drawer 108 may incorporate a scroll fan 122 and LTD 124, the LTD 124 similarly having a cold side and a hot side. However, the pullout chiller drawer 108 may incorporate a finned aluminum liquid/air heat exchanger (126) connected to the cold side of the LTD 124 and an LHE (128) connected to the hot-side. The scroll fan 122 may recirculate air over the finned aluminum liquid/air heat exchanger 126 to chill the interior and contents of the pullout chiller drawer 108.

The bottle cooling compartment 106 may include one or more passive-conduction cylindrical coolers (130, 132), each individual cooler sized to fit a bottle, can, or any like container as appropriate. Each cylindrical cooler 130, 132 may be connected to the cold side of an LTD 134, 136. Each LTD 134, 136 may be in communication (on its hot side) with an LHE 138, 140 supplied with chilled liquid coolant for cooling the hot sides of the LTDs (and thus chilling the cold sides and, by contact with the cold sides, the cylindrical coolers 130, 132).

Figure 3A:
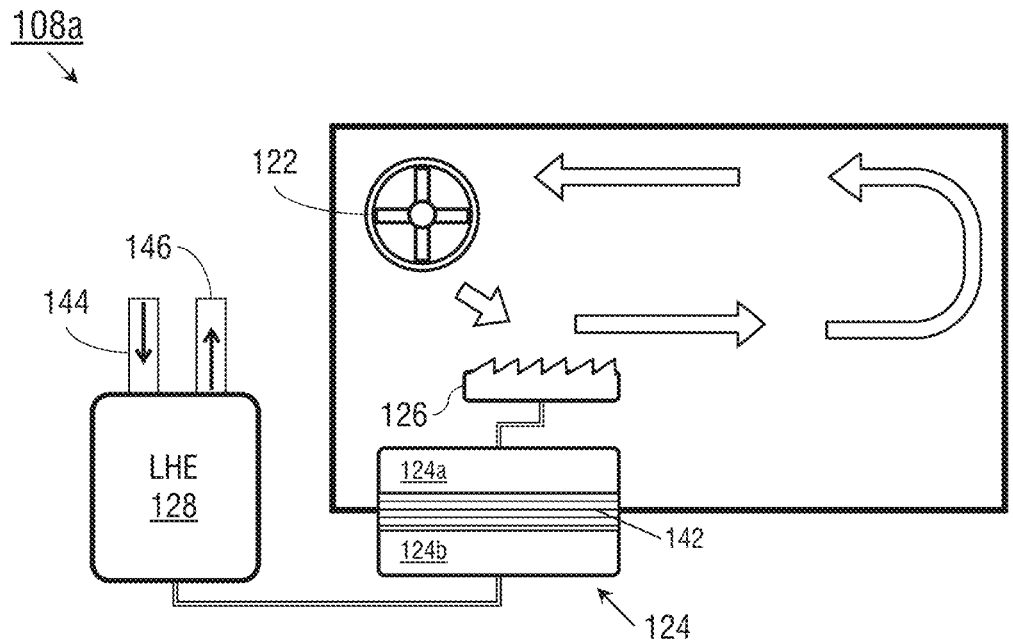
FIG. 3A is a diagrammatic illustration of a chiller compartment of the LRU of FIG. 1.

Referring now to FIG. 3A, the pullout chiller drawer 108a may be implemented and may function similarly to the pullout chiller drawer 108 of FIG. 2, except that the LTD 124 may include a thermoelectric module (142) between its cold side (124a) and hot side (124b). The thermoelectric module 142 may include, for example, P-type and T-type semiconductors sandwiched between inner conductive plates and outer ceramic plates. The LTD 124 may utilize thermoelectric effects and properties to directly convert between electric voltages (e.g., positive or negative) and temperature differentials. For example, the LTD 124 may generate a voltage in the thermoelectric module 142 based on a temperature differential between the cold side 124a and the hot side 124b. At the atomic level, an induced temperature gradient may cause charge carriers in the fluids of the cold side 124a and the hot side 124b to diffuse from the hot side to the cold side (or vice versa). This effect may be marshalled to generate electricity, measure temperature or change the temperature of proximate objects (e.g., the finned aluminum liquid/air heat exchanger 126 or the contents of the pullout chiller drawer 108a). Conversely, if a voltage is applied to the thermoelectric module 142, a temperature difference between the cold side 124a and the hot side 124b may result. As the direction of heating or cooling is determined by the polarity (e.g., positive/negative) of the voltage applied to the thermoelectric module 142, the LTD 124 may be used to control the temperature of the pullout chiller drawer 108a. For example, the LHE 128 in communication with the hot side (124b) of the LTD 124 may receive chilled liquid coolant (chilled and supplied by a recirculation system as shown in greater detail below by FIG. 4) through a supply line 144. The chilled liquid coolant cools the hot side (124b), which in turn cools the cold side (124a) of the LTD 124 and, finally, the finned aluminum liquid/air heat exchanger 126. The scroll fan 122 may recirculate air over the fins of the liquid/air heat exchanger 126 to chill the pullout chiller drawer 108a and its contents. The liquid coolant may be returned (at a warmer temperature) from the LHE 128 by a return line (146).

Figure 3B:
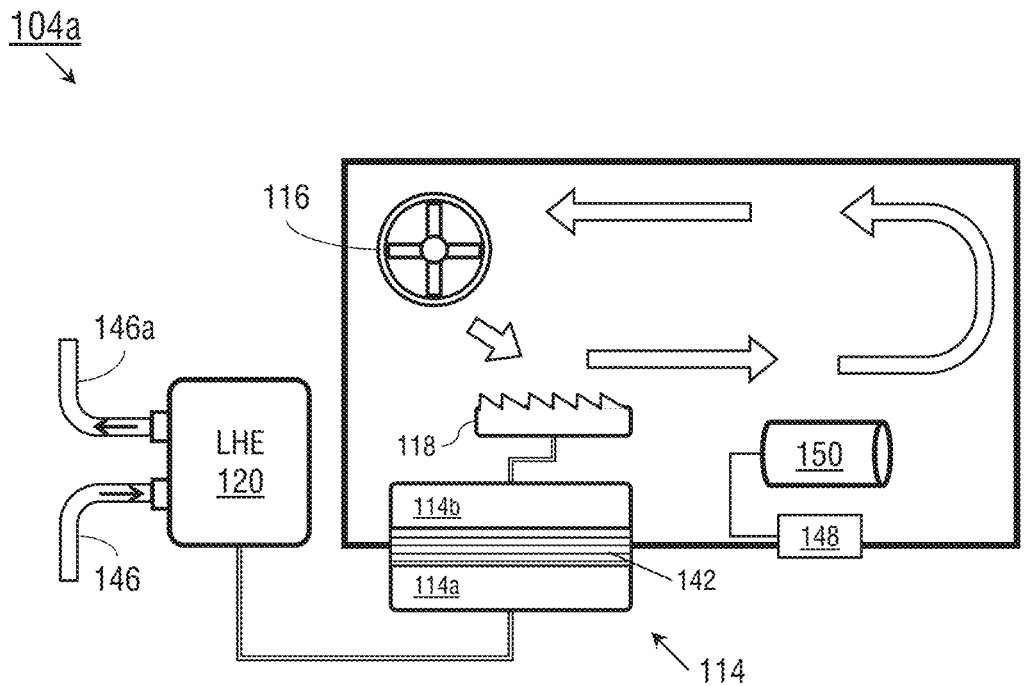
FIG. 3B is a diagrammatic illustration of a warmer compartment of the LRU of FIG. 1.

Referring now to FIG. 3B, the enclosed warming drawer 104a may be implemented and may function similarly to the enclosed warming drawer 104 of FIG. 2, except that the LTD 114 of the enclosed warming drawer 104a may incorporate a thermoelectric module 142 between the cold side (114a) and the hot side (114eb). Similarly to the LTD 124 of FIG. 3A, the LTD 114 may be in communication with an LHE 120, but on its cold side (114a). The LHE 120 may receive warmed liquid coolant (e.g., returning from the LHEs 128 shown by FIG. 3A) through the return line 146. Excess heat transfers from the warmed liquid coolant through the LHE 120, warming the cold side 114a of the LTD 114 (and thus the hot side 114b of the LTD 114, as well as the finned aluminum liquid/air heat exchanger 118 within the enclosed warming drawer 104a). The scroll fan 116 may draw air into the enclosed warming drawer 104a and heat the air by circulating it over and through the fins of the liquid/air heat exchanger 118. The LHE 120 may return the (now chilled) liquid coolant to the recirculation system (as shown by FIG. 4) via return lines (146a).

The enclosed warming drawer 104a may further include a temperature sensor 148 and auxiliary heating element 150. For example, when the temperature sensor 148 senses that the internal temperature of the enclosed warming drawer 104a has reached a predetermined threshold (e.g., 30° C.) the auxiliary heating element 150 may be switched on in order to further heat the interior of the enclosed warming drawer to a still higher temperature (e.g., 45° C.) and maintain the enclosed warming drawer at said temperature.

Figure 4:
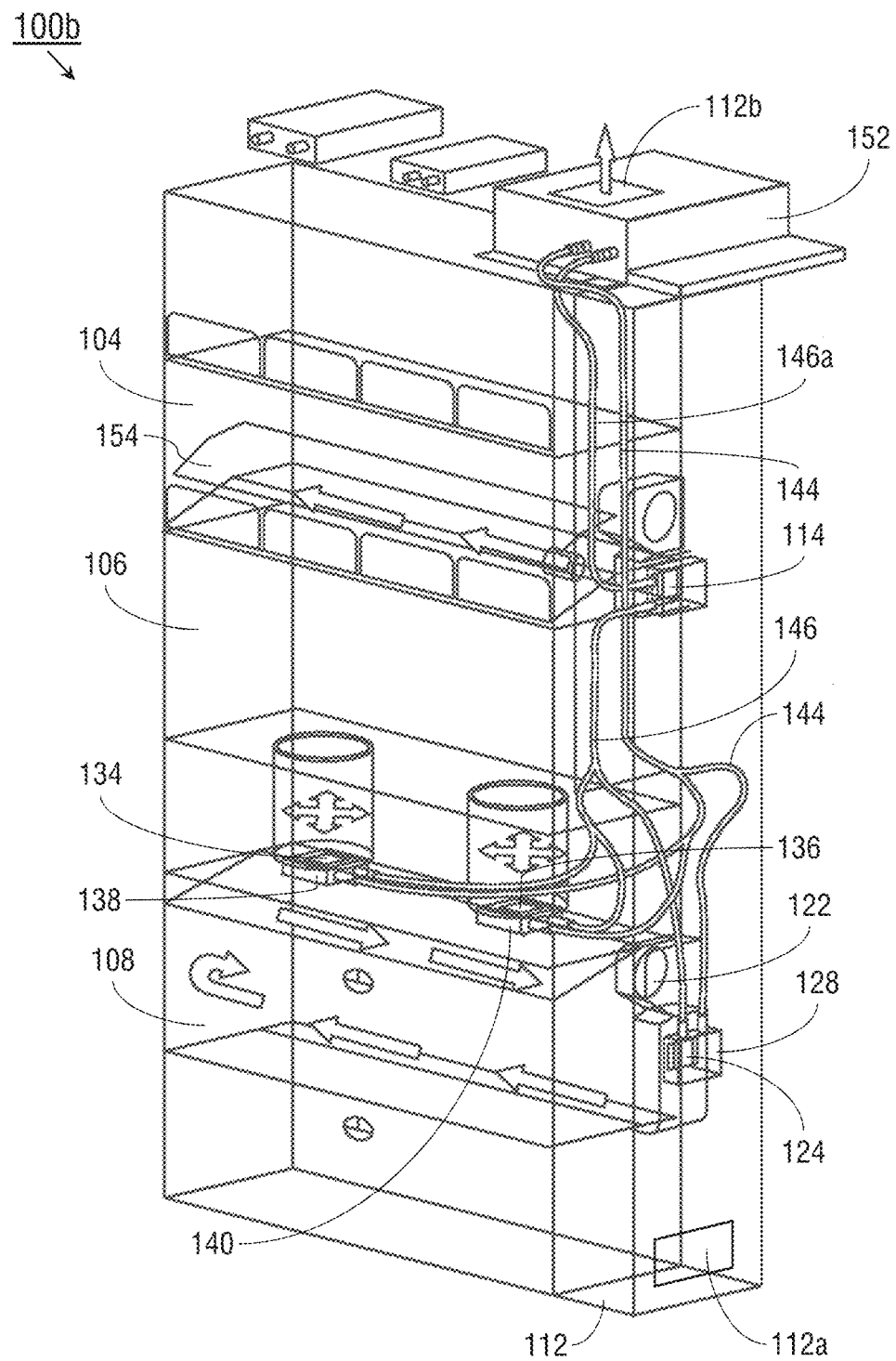
FIG. 4 illustrates a liquid coolant recirculation system of the LRU of FIG. 1.

Referring to FIG. 4, the galley bar unit 100b may be implemented and may function similarly to the galley bar unit 100a of FIG. 2, except that the galley bar unit 100b may include a liquid coolant recirculation system incorporating the supply lines 144, the return lines 146, 146a, and a liquid coolant recirculation unit 152 (LCRU) mounted atop the multilevel frame of the galley bar unit. Ambient air drawn into the chimney (112) via air intakes (112a) near the base of the galley bar unit 100b may be passed through the LCRU 152 to remove heat from the liquid coolant circulated throughout the galley bar unit by the LCRU; the ambient air may be expelled through upwardly directed exhaust vents (112b) of the LCRU. For example, the liquid coolant recirculation system may use propylene glycol/water (PGW) or any like appropriate liquid as a heat transfer fluid.

For example, the LCRU 152 may supply chilled liquid coolant to the LTDs 124, 134, 136 (located respectively within the pullout chiller drawer 108 and the bottle cooling compartment 106) via the coolant supply line 144 (e.g., through the hot-side LHEs 128, 138, 140). Similarly, the warmer liquid coolant may be returned to the LCRU 152 via return lines 146, 146a (e.g., for rechilling). The performance of the coolant recirculation system may be improved by routing warmer liquid coolant returning (via the return line 146) from the LTDs 124, 134, 136 through the LHE 120 in communication with the cold side (114a, FIG. 3A) of the LTD 114 (within the enclosed warming drawer 104) to further reduce the temperature of the returning liquid coolant before reaching the LCRU 152 via the return line 146a. Chilled liquid coolant supplied to the LTDs 124, 134, 136 may be used to chill air circulated through the pullout chiller drawer 108 by the scroll fan 122, or the chilled liquid coolant may be circulated through the cylindrical coolers 130, 132 of the bottle cooling compartment 106. Similarly, heat transferred from the liquid coolant returning to the LCRU 152 (via the return line 146) through the cold-side LHE 120 in communication with the LTD 114 may be used to heat air circulated through the enclosed warming drawer 104 (which may include one or more trays 154 for optimizing the available space within the drawer and facilitating air circulation).

Figure 5:
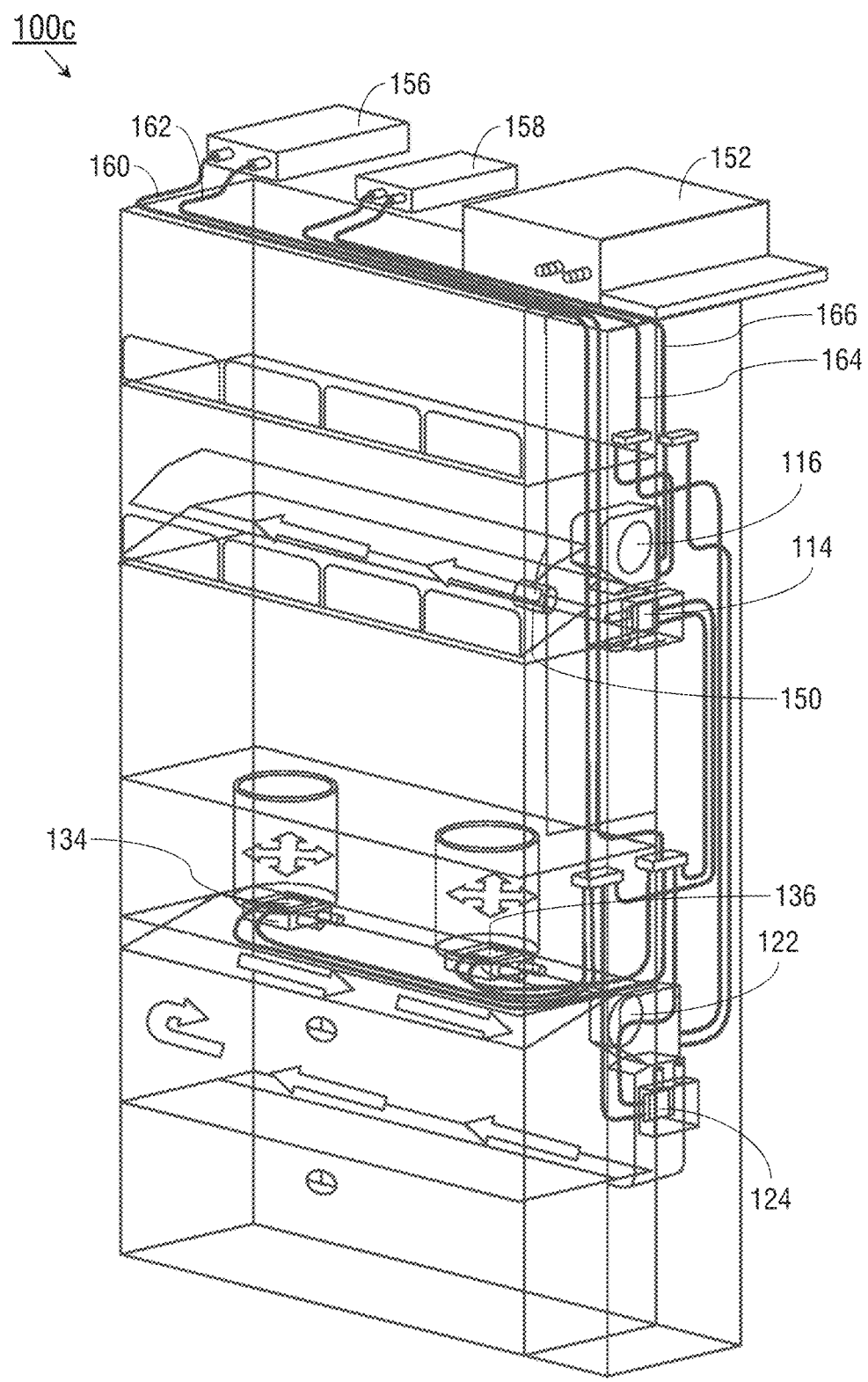
FIG. 5 illustrates power supply systems of the LRU of FIG. 1.

Referring to FIG. 5, the galley bar unit 100c may be implemented and may function similarly to the galley bar unit 100b of FIG. 4, except that the galley bar unit 100c may include an LTD power supply (156) and an auxiliary power supply (158). For example, the LTD power supply 156 may supply 13.5 V, 60-amp power (both positive and negative voltages) to the LTDs 114, 124, 134, 136 via positive-voltage wiring 160 and negative-voltage wiring 162. The auxiliary power supply 158 may supply 12 V, 20-amp power (both positive and negative voltages) to the scroll fans 116, 122 and the auxiliary heating element 150 via positive-voltage wiring 164 and negative-voltage wiring 166. The auxiliary power supply 158 (or the LTD power supply 156) may be an intelligent power supply in communication with the liquid coolant recirculation system (e.g., connected to the LCRU 152 or to temperature sensors (not shown) proximate to the supply lines 144 and return lines 146, 146a). For example, the auxiliary power supply may monitor the temperature differential between liquid coolant leaving the LCRU 152 via the supply lines 144 and returning to the LCRU 152 via the return lines 146, 146a, optimizing the speed of the scroll fans 116, 122 based on the current temperature differential.

As will be appreciated from the above, systems and methods according to embodiments of the inventive concepts disclosed herein may significantly reduce the size, cost, weight, and complexity of galley bar units through the incorporation of LTDs. Furthermore, the galley bar unit may be more customizable (e.g., via swappable compartments), its maintenance costs and mean time between failures (MTBF) significantly improved, and its eventual replacement far quicker and easier. In addition, the use of LTDs may eliminate the need for environmentally unfriendly fluids or gases in the manufacture and operation of galley chillers.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A solid-state liquid-chilled bar unit for an aircraft galley, comprising:
a multilevel frame configured to fit a galley of an aircraft and including a plurality of vertically stacked levels, each level configured to fit a line replaceable unit (LRU);
at least one liquid coolant recirculation unit (LCRU) disposed within the multilevel frame, the LCRU configured to circulate a liquid coolant through the plurality of LRUs via at least one supply line and receive returned liquid coolant from the plurality of LRUs via at least one return line;
the plurality of LRUs comprising at least one warmer compartment and at least one chiller compartment, the at least one warmer compartment including:
a first liquid thermoelectric device (LTD) having a first hot side and a first cold side, the first hot side thermally coupled to a first finned heat exchanger (FHE) and the first cold side in thermal communication with the LCRU, the first FHE configured to absorb heat from the liquid coolant via the first LTD; and
at least one first fan configured to internally heat the warmer compartment by circulating air over the first FHE;
and
the at least one chiller compartment including:
at least one second LTD having a second hot side and a second cold side, the second cold side thermally coupled to a second FHE and the second hot side in thermal communication with the LCRU, the second FHE configured to transfer heat to the liquid coolant via the second LTD;
and
at least one second fan configured to internally chill the chiller compartment by circulating air over the second FHE.

2. The solid-state liquid-chilled bar unit of claim 1, wherein the plurality of LRUs further comprises:
at least one unchilled compartment configured to store one or more of supplies, food, and liquids at an ambient galley temperature.

3. The solid-state liquid-chilled bar unit of claim 1, wherein the at least one chiller compartment is a first chiller compartment, further comprising:
at least one second chiller compartment comprising:
at least one third LTD having a third hot side and a third cold side, the third hot side in thermal communication with the LCRU;
and
at least one conductive cooler thermally coupled to the third cold side, the at least one conductive cooler configured to accept a container for chilling.

4. The solid-state liquid-chilled bar unit of claim 1, wherein:
the at least one first cold side is in thermal communication with the LCRU via at least one first liquid heat exchanger (LHE);
and
the at least one second hot side is in thermal communication with the LCRU via at least one second LHE.

5. The solid-state liquid-chilled bar unit of claim 1, further comprising:
at least one air shaft extending vertically along a side of the multilevel frame, the air shaft configured to:
draw ambient air into the air shaft through at least one opening;
raise or lower a temperature of the liquid coolant by passing the ambient air over the LCRU;
and
expel the ambient air from the air shaft through at least one directed outlet.

6. The solid-state liquid-chilled bar unit of claim 1, wherein:
the at least one warmer compartment and the at least one chiller compartment include one or more drawers at least partially removable from the multilevel frame.

7. The solid-state liquid-chilled bar unit of claim 1, further comprises:
at least one temperature sensor internally disposed within the warmer compartment, the temperature sensor configured to determine an internal temperature of the warmer compartment;
and
at least one auxiliary heater communicatively coupled to the temperature sensor and configured to:

activate when the internal temperature reaches a temperature threshold;
and
maintain the internal temperature at a first temperature greater than the temperature threshold.

8. The solid-state liquid-chilled bar unit of claim 1, further comprising:
at least one power supply configured to provide one or more of a negative voltage and a positive voltage, the at least one power supply comprising:
a first power supply associated with a first voltage and coupled to the at least one first LTD and the at least one second LTD;
and
a second power supply associated with a second voltage and coupled to one or more of the first fan and the second fan.

9. The liquid-chilled bar unit of claim 1, wherein the plurality of LRUs includes at least one first LRU configured to be removed from a first level of the plurality of vertically stacked levels and removably installed into a second level, the second level similarly dimensioned to the first level.

10. A liquid-chilled bar unit for an aircraft galley, comprising:
a multilevel frame configured to fit a galley of an aircraft, the multilevel frame comprising a plurality of vertically stacked slots;
at least one warmer compartment configured to fit a first stacked slot, the at least one warmer compartment including:
a first liquid thermoelectric device (LTD) having a first hot side and a first cold side;
a first finned heat exchanger (FHE) thermally coupled to the first hot side;
a first liquid heat exchanger (LHE) thermally coupled to the first cold side;
and
a first fan configured to internally heat the warmer compartment by circulating air over the first finned liquid/air heat exchanger;
at least one chiller compartment configured to fit a second stacked slot and comprising:
at least one second LTD having a second hot side and a second cold side;
and
at least one second LHE thermally coupled to the second hot side, the chiller compartment selected from a group including:
a first chiller compartment, the first chiller compartment further comprising:
a second FHE thermally coupled to the second cold side;
and
a second fan configured to internally chill the first chiller compartment by circulating air over the second FHE;
or
a second chiller compartment, the second chiller compartment comprising:
at least one conductive cooler thermally coupled to the second cold side, the conductive cooler configured to accommodate a container for chilling;
at least one unchilled compartment configured to fit a third stacked slot, the unchilled compartment configured to store at least one of food, liquid, and supplies at or near an ambient cabin temperature;
a liquid coolant recirculation unit (LCRU) configured to:
supply a liquid coolant to the at least one second LHE via one or more supply lines;
and
receive the returning liquid coolant from the at least one first LHE via one or more return lines;
and
at least one power supply coupled to a power source of the aircraft, the power supply including at least one of:
a first power supply associated with at least one first voltage and configured to supply operating power to the at least one first LTD and the at least one second LTD;
and
a second power supply associated with at least one second voltage and configured to supply operating power to the at least one first fan and the at least one second fan.

11. The liquid-chilled bar unit of claim 10, further comprising:
at least one air shaft extending vertically along a side of the multilevel frame, the air shaft configured to:
draw ambient air into the air shaft through at least one opening;
chill or warm the liquid coolant by passing the ambient air over the LCRU;
and
expel the ambient air from the air shaft through at least one upwardly directed outlet.

12. The liquid-chilled bar unit of claim 10, further comprising:
at least one first sensor coupled to the supply line and configured to determine a first temperature of the liquid coolant;
at least one second sensor coupled to the return line and configured to determine a second temperature of the returning liquid coolant;
and
at least one processor configured to determine a delta of the first temperature and the second temperature.

13. The liquid-chilled bar unit of claim 10, wherein one or more of the at least one warmer compartment and the at least one chiller compartment-includes at least one drawer at least partially removable from the multilevel frame.

14. The liquid-chilled bar unit of claim 10, wherein the at least one warmer compartment further comprises:
at least one temperature sensor configured to determine an internal temperature of the warmer compartment;
and
at least one auxiliary heater coupled to the temperature sensor and configured to:
activate when the internal temperature reaches a temperature threshold;
and
maintain the internal temperature at a first temperature higher than the temperature threshold.

15. The liquid-chilled bar unit of claim 10, wherein one or more of the at least one warmer compartment and the at least one chiller compartment includes at least one compartment fully removable from a stacked slot of the multilevel frame and removably installable in a similarly dimensioned stacked slot of the multilevel frame.

* * * * *